Patented Jan. 6, 1953

2,624,740

UNITED STATES PATENT OFFICE 2,624,740

PROCESS OF PREPARING α-ACETO-PYRIDINES

Stanley H. Hesse, Phillipsburg, N. J., assignor to General Aniline & Film Corporation, New York, N. Y., a corporation of Delaware No Drawing. Application June 1, 1951,
Serial No. 229,519

6 Claims. (Cl. 260—297)

1

This invention relates to α-acetopyridines and particularly to an improved process of preparing the same.

It is known that α-acetopyridine can be synthesized by several methods. The compound can be prepared from calcium picolinate by fusion with calcium acetate. It has been prepared from β-2-pyridyl-β-oxo-ethylpropionate by acid hydrolysis and decarboxylation. The widely acceptable method to date has been its preparation from ethyl picolinoyl acetate, which is prepared by a three-step reaction from α-picoline. All of these methods are involved, time consuming, and use relatively expensive and sometimes unavailable chemicals.

I have found that α-acetopyridines can be readily prepared in a very economical manner by utilizing as the starting materials commercially available α-vinylpyridine and nuclear substituted α-vinylpyridines which are converted to the α-halo-methyl-2-pyridyl lower alkyl ethers, followed by removal of hydrogen halide and hydrolysis to the desired α-acetopyridine.

Accordingly, it is an object of the present invention to provide an improved method for the preparation of such α-acetopyridines.

Other objects and advantages will become apparent from the following description.

The foregoing objects are readily accomplished by reacting α-vinylpyridine or nuclear substituted α-vinylpyridine with a halogen, such as bromine or chlorine and a lower alkyl alcohol, either in the presence or absence of an acid binding agent at a temperature below 20° C., i. e., ranging from —5 to 15° C., preferably at 0° to 10° C., for a time sufficient to permit the equivalent weight of chlorine or bromine to be absorbed by the α-vinylpyridine. During this initial reaction, a lower alkoxy group and either bromine or chlorine are simultaneously introduced to the vinyl group of the α-vinylpyridine. A heavy precipitate of the insoluble inorganic salt is formed early in the reaction. The halogen, i. e., chlorine or bromine, is passed into the reaction until the required weight of halogen has been absorbed as indicated by the increase in weight. As this point, the reaction is usually acidic in character and a positive test for hypochlorite ion is obtained if the addition of halogen is continued. This is to be avoided. At the end of the addition of either

2 bromine or chlorine, the precipitated inorganic salt may be removed by filtration, but this is not absolutely necessary. The intermediate is the (α-lower alkoxy-β-halo) - 2 - ethylpyridine which may be isolated if desired at this point. This intermediate readily loses the elements of hydrogen halide by heating an alcoholic solution with an excess of alkali, preferably sodium or potassium hydroxide. The addition of water and acidification with dilute aqueous acid hydrolyzes the intermediate vinyl ether to give the desired α-acetopyridine which is characterized by the following general formula:

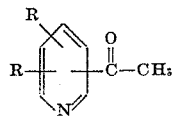

wherein R represents hydrogen, a lower alkyl group, e. g., methyl, ethyl, propyl, isopropyl, butyl, and the like.

As examples of suitable α-vinylpyridines and nuclear substituted α-vinylpyridines which may be reacted with a lower alcohol and with either chlorine or bromine according to the foregoing procedure, the following are illustrative:

2-vinylpyridine
3-vinylpyridine
4-vinylpyridine
5-ethyl-2-vinylpyridine
2-methyl-5-vinylpyridine
2-propyl-5-vinylpyridine
2-methyl-6-vinylpyridine
2-butyl-6-vinylpyridine
2,4-dimethyl-6-vinylpyridine
2,4-diethyl-6-vinylpyridine When utilizing gaseous chlorine, the chlorination of the α-vinylpyridine or nuclear substituted α-vinylpyridine, which hereinafter and in the claims will be referred to merely as α-vinylpyridine, is effectuated, as pointed out above, either in the presence or absence of an alkaline medium, such as an acid binding agent, such as hydroxides or carbonates of alkali metals or alkaline earth metals, heterocyclic nitrogenous bases, such as pyridine, dimethylpyridine, ethylpyridine, ethylmethylpyridine, trimethylpyridine, quinoline and the like, trialkylamine, such as trimethylamine, triethylamine, tributylamine, etc., alkoxides of alkali metals, such as sodium alkoxides, and alkali metal salts of lower aliphatic acids, such as sodium acetate. It is preferable to carry out the addition of halogen at a lower temperature, i. e., −5 to 5° C. The alkaline reagent is preferably used in an amount in excess to the equimolecular amount of the α-vinylpyridine and may be added all at once, portionwise, or by gradual addition. Throughout the main part of the chlorination, the pH of the reaction mixture remains above 10, and a weak hypochlorite test is obtained by acidified potassium iodide solution. The addition of chlorine is discontinued when the pH reaches 6 to 7. At this point, chlorination does not increase the yield of the desired product and stronger hypochlorite tests are obtained.

After chlorination is complete, the white precipitate is filtered off and washed with a lower alcohol, preferably a cheaper alcohol, such as methanol. If the filtrate should be alkaline, i. e., between a pH of 7 to 8, it is brought back to a pH of 5 to 6 with a small amount of a concentrated mineral acid, preferably hydrochloric. The lower alcohol utilized in the reaction is stripped off through a column at atmospheric or reduced pressure until two layers are formed at which time most of the alcohol is removed.

Bromination is carried out in a manner similar to that employed for chlorination. Bromine is added dropwise to the α-vinylpyridine lower alcohol mixture either in the presence or absence of an alkali, i. e., acid condensing agent until the required weight has been absorbed corresponding to the formation of the bromoalkoxy derivative. At this point, the bromination is usually acidic in character and a positive test for hypobromite is obtained under conditions similar to those indicated for a positive hypochlorite test. At the end of the addition of bromine, the bromo derivative is isolated in a manner analogous to that utilized for the corresponding chloro derivative. The precipitated inorganic salts may be filtered and the alcohol removed by distillation.

The (α-lower alkoxy-β-halo)-2-ethylpyridine is then dehydrochlorinated or dehydrobrominated by heating, preferably under reflux, with an alcoholic solution with sodium or potassium hydroxide to yield the lower alkoxy-2-ethylpyridine which is readily hydrolyzed to the α-acetopyridine by heating with mineral acid or by heating in acetic acid containing water with or without a small amount of another acid, such as hydrochloric, sulfuric, phosphoric, hydrobromic, and the like. Any of these acids or mixtures thereof may be added prior to or during the hydrolysis reaction and prior to the bromination or chlorination reaction.

The following examples are illustrative of the method of preparing the α-acetopyridines and are not to be construed as being limitative.

EXAMPLE I

*2-acetopyridine*

In a 250 ml., 3-necked flask equipped with a stirrer, thermometer, and gas inlet and outlet tube were placed 21 grams (0.2 mol) of 2-vinylpyridine, 200 ml. of methanol, and 9.6 grams (0.24 mol) of sodium hydroxide. The solution was cooled to 0° to 5° C. by an ice bath and chlorine gas introduced over a period of 70 minutes until there was a gain in weight of 14.5 grams. The pH of the reaction mixture was 13–14 at this time. Introduction of chlorine for another minute caused the pH to suddenly drop to slightly below 7. The salt formed by the reaction was filtered off and washed with methanol. The filtrate consisting of 190 ml. contained the (α-methoxy, β-chloro) 2-ethylpyridine. This was divided into two equal parts. One portion was heated on a steam bath to remove the methanol, and then drowned in water to yield the impure intermediate as an oil.

The other portion was placed in a 250 ml., 3-necked flask equipped with a stirrer, thermometer and reflux condenser and heated to reflux after making it alkaline with the addition of 9.6 grams (0.24 mol) of sodium hydroxide. Salt began to separate at once, but the heating at reflux was continued for two hours. When cool, the reaction mixture was filtered from the salt and the filtrate acidified with 25 ml. of concentrated hydrochloric acid in 225 ml. of water which was sufficient to make it acid to Congo paper. The acid solution was heated on a steam bath for an hour and then allowed to cool. It was made alkaline to phenolphthalein with 40% sodium hydroxide and then extracted with ether. Evaporation of the ether left a brown oil as a residue. A sample of this oil was treated with phenyl hydrazine in 50% ethanol solution to yield a yellow precipitate which melted at 154–155° C. Recrystallization from ethanol raised the melting point to 154.5 to 155° C. The literature value of the melting point of the phenyl hydrazine of α-acetopyridine was 155° C. Another sample of the ether residue formed a p-nitro phenyl hydrazone which melted at 262–263° C. after crystallization from acetic acid.

EXAMPLE II

*2-acetopyridine*

In a 3-liter, 3-necked flask equipped with a stirrer, thermometer and gas inlet and outlet tube there were placed 210 grams (2 mols) of 2-vinylpyridine, 2000 ml. of methanol, and 96 grams (2.4 mols) of sodium hydroxide. When solution was complete, it was cooled to 3° C. and chlorine introduced in 1¼ hours. When the reaction mixture was acid to pH paper, 192 grams (4.8 mols) of sodium hydroxide were added and the reaction mixture slowly heated to reflux for 2 hours. It was then cooled and 550 ml. of concentrated hydrochloric acid were added to make the reaction mixture acid to Congo paper. The acid solution was heated to reflux, and the methanol allowed to distill over. 1850 ml. of methanol were collected. The concentrated reaction product was made alkaline by the addition of 300 ml. of 40% sodium hydroxide. The reaction mixture now contained a brown oil and a voluminous precipitate of salt. Sufficient water was added to dissolve the salt and the oil was separated in a separatory funnel. About 200 ml. of benzene were added to the oil and the benzene solution refluxed until all water was removed. The benzene was then distilled off and the residue was fractionally distilled at 58 mm. The fraction boiling at 110.0 to 110.5° C. was collected and weighed 25.5 (10.5% of the theoretical yield). It was slightly yellow in color and had a fragrant odor. The refractive index at 25° C. was 1.5172.

Analysis for $C_7H_7NO$:
 Per cent C theory 69.40—found 70.68
 Per cent H theory 5.83—found 6.44
 Per cent N theory 11.57—found 11.11

EXAMPLE III

5-ethyl-2-acetopyridine

The process of Example I was repeated with the exception that 26.6 parts of 5-ethyl-2-vinylpyridine were used instead of 21 parts of 2-vinylpyridine. The yield of 5-ethyl-2-acetopyridine was excellent.

EXAMPLE IV

5-methyl-2-acetopyridine

The process of Example II was repeated with the exception that 238 parts of 2-methyl-5-vinylpyridine were used instead of 210 parts of 2-vinylpyridine.

EXAMPLE V

6-methyl-2-acetopyridine

The process of Example II was repeated with the exception that 238 parts of 2-methyl-6-vinylpyridine were used instead of 210 parts of 2-vinylpyridine. The yield of 6-methyl-2-acetopyridine was good, although the percentage of conversion was slightly low.

EXAMPLE VI

4,6-dimethyl-2-acetopyridine

The process of Example II was repeated with the exception that 266 parts of 2,4-dimethyl-6-vinylpyridine were used instead of 210 parts of 2-vinylpyridine. The yield of 4,6-dimethyl-2-acetopyridine was good and the percentage of conversion was satisfactory.

I claim:
1. The process of preparing α-acetopyridines characterized by the following formula:

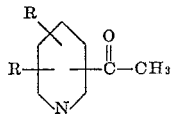

wherein R represents a member selected from the class consisting of hydrogen and lower alkyl, which comprises reacting α-vinylpyridine with a lower alcohol and a halogen selected from the class consisting of bromine and chlorine at a temperature below 20° C. to yield (α-lower alkoxy-β-halo)-2-ethylpyridine, dehydrohalogenating the (α-lower alkoxy-β-halo)-2-ethylpyridine by heating in the presence of alcoholic alkali, by separating the α-alkoxy-2-ethylpyridine, and hydrolyzing it in water to α-acetopyridine.

2. Process according to claim 1, wherein the α-vinylpyridine is 2-vinylpyridine.

3. Process according to claim 1, wherein the α-vinylpyridine is 5-ethyl-2-vinylpyridine.

4. Process according to claim 1, wherein the α-vinylpyridine is 2-methyl-5-vinylpyridine.

5. Process according to claim 1, wherein the α-vinylpyridine is 2-methyl-6-vinylpyridine.

6. Process according to claim 1, wherein the α-vinylpyridine is 2,4-dimethyl-6-vinylpyridine.

STANLEY H. HESSE.

No references cited.